United States Patent
Ahmed et al.

(10) Patent No.: US 11,115,133 B2
(45) Date of Patent: Sep. 7, 2021

(54) METHOD AND APPARATUS FOR A WIRELESS CHARGING AND COMMUNICATION SYSTEM

(71) Applicants: Walid Khairy Mohamed Ahmed, Tinton Falls, NJ (US); Mohsen Sarraf, Rumson, NJ (US); Xiaopeng Huang, Somerset, NJ (US)

(72) Inventors: Walid Khairy Mohamed Ahmed, Tinton Falls, NJ (US); Mohsen Sarraf, Rumson, NJ (US); Xiaopeng Huang, Somerset, NJ (US)

( * ) Notice: Subject to any disclaimer, the term of this patent is extended or adjusted under 35 U.S.C. 154(b) by 216 days.

(21) Appl. No.: 15/700,130

(22) Filed: Sep. 10, 2017

(65) Prior Publication Data
US 2019/0245628 A1    Aug. 8, 2019

Related U.S. Application Data

(63) Continuation of application No. 14/563,882, filed on Dec. 8, 2014, now Pat. No. 9,787,413.

(51) Int. Cl.
*H04B 11/00* (2006.01)

(52) U.S. Cl.
CPC ............................ *H04B 11/00* (2013.01)

(58) Field of Classification Search
CPC . B32B 3/10; B29C 70/34; C08L 63/00; C23C 14/32; G01N 29/00; G06F 3/0484; H04L 63/061; H04L 9/00; H04R 1/10; H04B 11/00; H04B 10/00; H04B 7/24; G01S 1/00; G01S 11/16; G01S 13/862
See application file for complete search history.

(56) References Cited

U.S. PATENT DOCUMENTS

| | | | | |
|---|---|---|---|---|
| 3,336,949 A |   | 8/1967 | Ridout | |
| 3,555,189 A | * | 1/1971 | Quatse | G06F 3/16 379/373.01 |
| 3,706,932 A |   | 12/1972 | Gehman | |
| 3,706,982 A | * | 12/1972 | Gehman | G08B 13/26 340/539.1 |
| 3,709,084 A | * | 1/1973 | Stobaugh | G10H 1/46 84/726 |
| 3,726,334 A | * | 4/1973 | Sallberg | B22D 17/32 164/155.3 |
| 3,727,216 A | * | 4/1973 | Antonio | G01S 13/56 342/28 |
| 3,727,322 A |   | 4/1973 | Umbaugh | |

(Continued)

*Primary Examiner* — Isam A Alsomiri
*Assistant Examiner* — Amie M Ndure
(74) *Attorney, Agent, or Firm* — Patrick Reilly

(57) ABSTRACT

Circuits, systems and methods that utilize two transducers, of which at least one is a piezoelectric transducer, adapted and coupled to receive and/or generate signals that include a power transmission component and an informational content in the forms of sound waves, mechanical vibrations, and/or electromagnetic energy. In one version, two transducers each receive and/or generate separate vibrational energy signals that bear information and transmit electrical power. Two or more transducers coupled to a switching circuit may send or receive piezo-electrical circuit output signals that include a carrier wave having different frequencies that are within separate frequency ranges. Two or more transducers may generate output signals that are simultaneously processed by or multiplexed by a switching circuit.

21 Claims, 13 Drawing Sheets

(56) References Cited

U.S. PATENT DOCUMENTS

| | | | | |
|---|---|---|---|---|
| 3,727,822 A * | 4/1973 | Umbaugh | B23K 20/10 | 228/1.1 |
| 3,735,323 A * | 5/1973 | Marscher | G01L 9/0057 | 338/41 |
| 3,740,532 A * | 6/1973 | Esch | G06F 7/38 | 377/45 |
| 3,836,949 A * | 9/1974 | Ergon | G01S 13/18 | 367/95 |
| 4,235,153 A * | 11/1980 | Rinde | F01B 25/26 | 310/14 |
| 4,361,060 A * | 11/1982 | Smyth | B60W 10/02 | 477/120 |
| 4,506,563 A | 3/1985 | Hiramatsu | | |
| 4,523,472 A * | 6/1985 | Blades | G01F 23/296 | 367/903 |
| 4,583,171 A | 4/1986 | Hara | | |
| 4,766,988 A * | 8/1988 | Seibert | F16D 48/066 | 180/197 |
| 4,799,158 A | 1/1989 | Patil | | |
| 5,136,175 A | 8/1992 | Losel | | |
| 5,186,175 A * | 2/1993 | Hirama | G01S 15/8925 | 600/443 |
| 5,194,634 A | 3/1993 | Lisle et al. | | |
| 5,194,684 A * | 3/1993 | Lisle | G10H 1/06 | 327/100 |
| 5,477,359 A | 12/1995 | Engeler | | |
| 5,477,859 A * | 12/1995 | Engeler | G01S 7/52047 | 600/447 |
| 5,517,996 A * | 5/1996 | Okada | B06B 1/0223 | 600/447 |
| 5,953,694 A * | 9/1999 | Pillekamp | H04B 7/24 | 704/201 |
| 6,005,954 A * | 12/1999 | Weinfurtner | H04R 25/507 | 381/312 |
| 6,158,288 A * | 12/2000 | Smith | G01F 1/667 | 73/861.25 |
| 6,194,901 B1 * | 2/2001 | Carton | G01R 31/396 | 324/434 |
| 6,477,140 B1 * | 11/2002 | Uda | H04L 12/403 | 370/216 |
| 6,821,251 B2 * | 11/2004 | Alexandru | G01S 7/52079 | 600/447 |
| 7,525,050 B1 | 4/2009 | Weaver | | |
| 7,573,397 B2 * | 8/2009 | Petrovic | E21B 47/185 | 340/854.6 |
| 7,764,601 B2 * | 7/2010 | Murai | H04L 43/0817 | 370/217 |
| 8,451,120 B2 | 8/2013 | Johnson, Jr. et al. | | |
| 9,005,263 B2 * | 4/2015 | Boyden | A61F 2/30 | 607/96 |
| 9,104,788 B2 | 8/2015 | Friedman et al. | | |
| 9,430,938 B2 | 8/2016 | Proud | | |
| 9,754,229 B2 | 9/2017 | Romanoff et al. | | |
| 10,063,369 B1 | 8/2018 | Murphy | | |
| 2002/0000916 A1 | 1/2002 | Richards | | |
| 2002/0021468 A1 * | 2/2002 | Kato | H04B 10/299 | 398/135 |
| 2002/0030596 A1 | 3/2002 | Finn | | |
| 2005/0121243 A1 | 6/2005 | MacConney | | |
| 2009/0015096 A1 * | 1/2009 | Puskas | B06B 1/0284 | 310/317 |
| 2013/0113336 A1 * | 5/2013 | Spigelmyer | B06B 1/0292 | 310/314 |
| 2017/0019525 A1 | 1/2017 | Hannon | | |

* cited by examiner

METHOD AND APPARATUS FOR A WIRELESS CHARGING AND COMMUNICATION SYSTEM

CO-PENDING PATENT APPLICATION

This Nonprovisional patent application is a Continuation-in-Part Application to U.S. Nonprovisional patent application Ser. No. 14/563,882 titled "Circuits, Systems and Methods of Hybrid Electromagnetic and Piezoelectric Communicators" as filed on Dec. 8, 2014 by Inventors Walid Khairy Mohamed Ahmed, Mohsen Sarraf Rumson, and Xiaopeng Huang. This Nonprovisional patent application claims benefit of the priority date of Dec. 8, 2014 of said U.S. Nonprovisional patent application Ser. No. 14/563,882. Furthermore, said U.S. Nonprovisional patent application Ser. No. 14/563,882 is incorporated in its entirety and for all purposes into this present Nonprovisional patent application.

TECHNICAL FIELD

The present invention relates to communication circuits, systems and methods. More particularly, the present invention relates to circuits that employ sound wave, mechanical vibration, and/or electromagnetic wave energy to transfer information.

BACKGROUND

Electromagnetic wave energy, such as radio frequency (RF) waves and light, has been widely used to transmit information-bearing signals, but can be easily intercepted. The prior art further includes the transmission of information bearing signals in the mode of sound waves (such as acoustic waves and ultrasonic waves), pressure waves, or other types of mechanical vibrations with piezoelectric transducers. Compared to electromagnetic wave energy, sound wave energy is optimal for signal transmission in certain environments. For example, sound wave can pass through a Faraday cage. Also, certain types of sound waves, such as ultrasonic waves and acoustic waves, have a very limited propagation range, and thus make the interception of signal outside such a short propagation range impossible. However, no optimal combination of both forms of communications have been established. Therefore, there is a long-felt need for circuits, systems and methods that utilize either or both electromagnetic wave energy and pressure wave energy, e.g., sound wave energy, to receive and/or generate information bearing signals or information encoded signals optionally in combination with transmissions of electromagnetic energy and/or pressure wave energy.

In addition, different sound wave transducing media have different characteristics. There is also a long-felt need for circuits, systems and methods that enable transmission of signals in the form of pressure wave energy, e.g., sound wave energy and/or electromagnetic energy in a complex environment that is composed of multiple components and optionally with pressure wave energy conducting medium or media. The present invention is offered to meet these two stated objects and other objects that are made obvious in light of the present disclosure.

SUMMARY AND OBJECTS OF THE PRESENT INVENTION

This Summary is provided to introduce a selection of concepts in a simplified form that are further described below in the Detailed Description. This Summary is not intended to identify key features or essential features of the claimed subject matter, nor is this Summary intended to be used to limit the scope of the claimed subject matter.

Described embodiments provide hybrid communicator circuits, systems, and methods. In one embodiment, such a communicator circuit is adapted to couple with an output target circuit to which it transmits an output signal. Such a communicator circuit may include a first signal front end adapted for coupling with the first piezoelectric transducer; a second signal front end adapted for coupling with the second transducer; and/or a switching circuit coupled to the first signal front end, the second signal front end, and a processing circuit. The switching circuit is adapted to enable a transmission of a switching circuit output signal to the processing circuit. The processing circuit is disposed between the switching circuit and the output target circuit and adapted to receive the switching circuit output signal and transmit an output signal to the output target circuit. The switching circuit output signal is substantively derived from a first signal received from the first piezoelectric transducer and a second signal received from the second transducer. The output signal substantively derived from the switching output signal.

Various alternate preferred embodiments of the invented method employ more than one transducer to simultaneously or near-simultaneously send and/or receive information bearing pressure wave signals.

BRIEF DESCRIPTION OF THE DRAWINGS

These, and further features of the invention, may be better understood with reference to the accompanying specification and drawings depicting the preferred embodiment, in which.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events, which are logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is understood that the numerical designation of "N", "N" or "NN" is herein meant to indicate that the quantity of individual elements of a plurality of a certain type of element, may be arbitrarily large and as required by a particular embodiment of the invented method. It is further understood that the numerical designation of "N", "N" or "NN" is not meant to indicate that different series of distinguishable instances of particular devices, systems, servers, or data types are of a same quantity of occurrences, but rather that each series referred to as having N or NN members or instances may be arbitrarily large and as required by a particular application or embodiment of the invented method.

Figure 1:
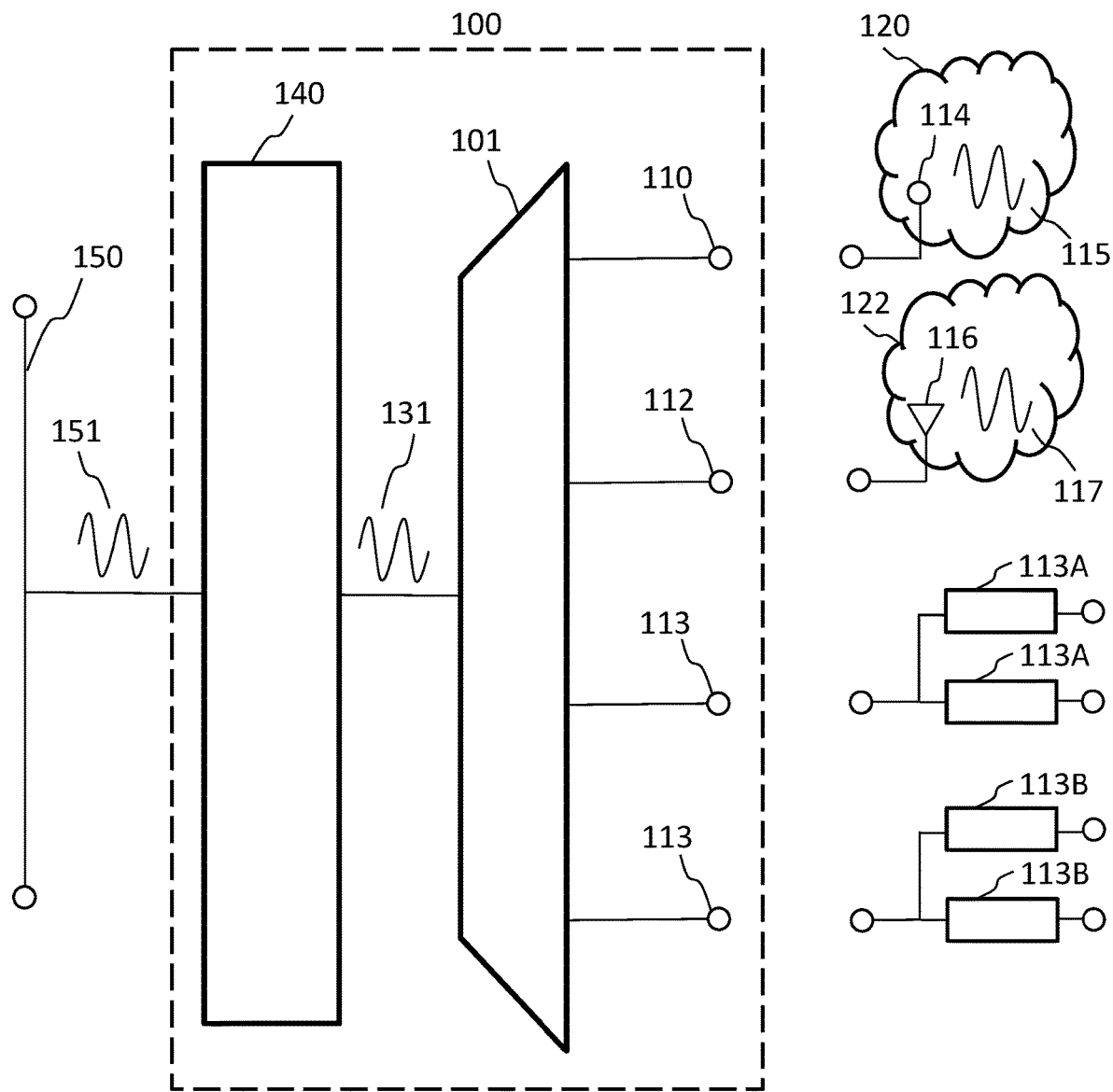
FIG. 1 is a block diagram of a first embodiment of the invented communicator circuit.

FIG. 1 illustrates a first communicator circuit 100 according to one embodiment. As shown in FIG. 1, the first communicator circuit 100 includes a front-end circuit 101, a first signal front end 110, and a second signal front end 112. The first signal front end 110 is adapted for electrically coupling with a first piezoelectric transducer 114. The piezoelectric transducer 114 is a device that is capable of converting a piezosignal 115 to electric signals. According to several embodiments, the piezosignal 115 can be sonic waves, ultrasonic waves, pressure waves, or other types of mechanical vibrations.

Conversely, such piezoelectric transducer may also be capable of converting electric signals to the piezosignal 115. In one embodiment, the piezoelectric transducer 114 is or comprises an ultrasonic transducer, such as a ceramic transducer APC International, Ltd. with an address at 46 Heckman Gap Road, Mill Hall, Pa. 17751, USA, or other suitable piezoelectric transducer known in the art. The second signal front end 112 is adapted for electronic coupling with a second transducer 116 that is adapted for converting a second signal 117 to electric signals or vice versa. In one embodiment, the second transducer 116 is a second piezoelectric transducer. According to a yet further embodiment of the invention, the second transducer 116 is an electromagnetic transducer. The electromagnetic transducer 116 is a device capable of converting electric signals to electromagnetic signals. The electromagnetic signals may be either electric signals, or magnetic signals, or electromagnetic signals. Conversely, the electromagnetic transducer 116 may also be capable of converting electromagnetic signals to electric signals. In one embodiment, the electromagnetic transducer 116 is a radio frequency transmitter and/or receiver. In another embodiment, the electromagnetic transducer 116 is an optical transmitter and/or receiver. In yet another embodiment, the electromagnetic transducer 116 is an infrared transmitter and/or receiver. The front-end circuit 101 is electrically coupled with both the first signal front end 110 and the second signal front end 112. The front-end circuit 101 is adapted for electrically coupling with, and transmitting a switching circuit output signal 131 to a processing circuit 140. The processing circuit 140 is electrically coupled with and disposed between the frond-end circuit 101 and the output target circuit 150, and is adapted to receive the switching circuit output signal 131 and transmit an output signal 151 to the output target circuit 150. The switching circuit output signal 131 derives from the piezosignal 115 that is received from the first piezoelectric transducer 114 and/or a second signal 117 that is received from the second transducer 116. The output signal 151 is substantively derived from the switching circuit output signal 131. In one embodiment, the piezosignal 115 and the second signal 117 are the same signal. Besides the first signal front end 110 and the second signal front end 112, other embodiments may further include one or more signal front ends 113 that are electronically coupled with the front-end circuit 101 and adapted for electronically coupling with other transducers 113A & 113B, either electromagnetic transducers 113A or piezoelectric transducers 113B.

As illustrated in FIG. 1, the first piezoelectric transducer 114 can receive and/or transmit the piezosignal 115 through a first piezoconducting medium 120, which is capable of transporting pressure waves, vibrations, or other types of mechanical energy. The piezoconducting medium 120 can be a solid material (for example, wood, metal, water pipes, drywall, electrical wires, or optical fibers), liquid material (for example, water), gaseous material (for example, air), or composite material (for example, human body). The second transducer 116 can receive and/or transmit the second signal 117 through a second communication medium 122. The second communication medium 122 can be a second piezoconduction medium or an electromagnetic medium that is capable of transporting electric or electromagnetic energy. In one embodiment, the first piezoconducting medium 120 and the second communication medium 122 are the same medium. Yet in another embodiment, the first piezoconducting medium 120 and the second communication medium 122 are different and segregated mediums, and therefore, the piezosignal 115 that is received and/or transmitted through the first piezoelectric transducer 114 do not interfere with the second signal 117 that is received and/or transmitted through the second transducer 116.

Figure 2:
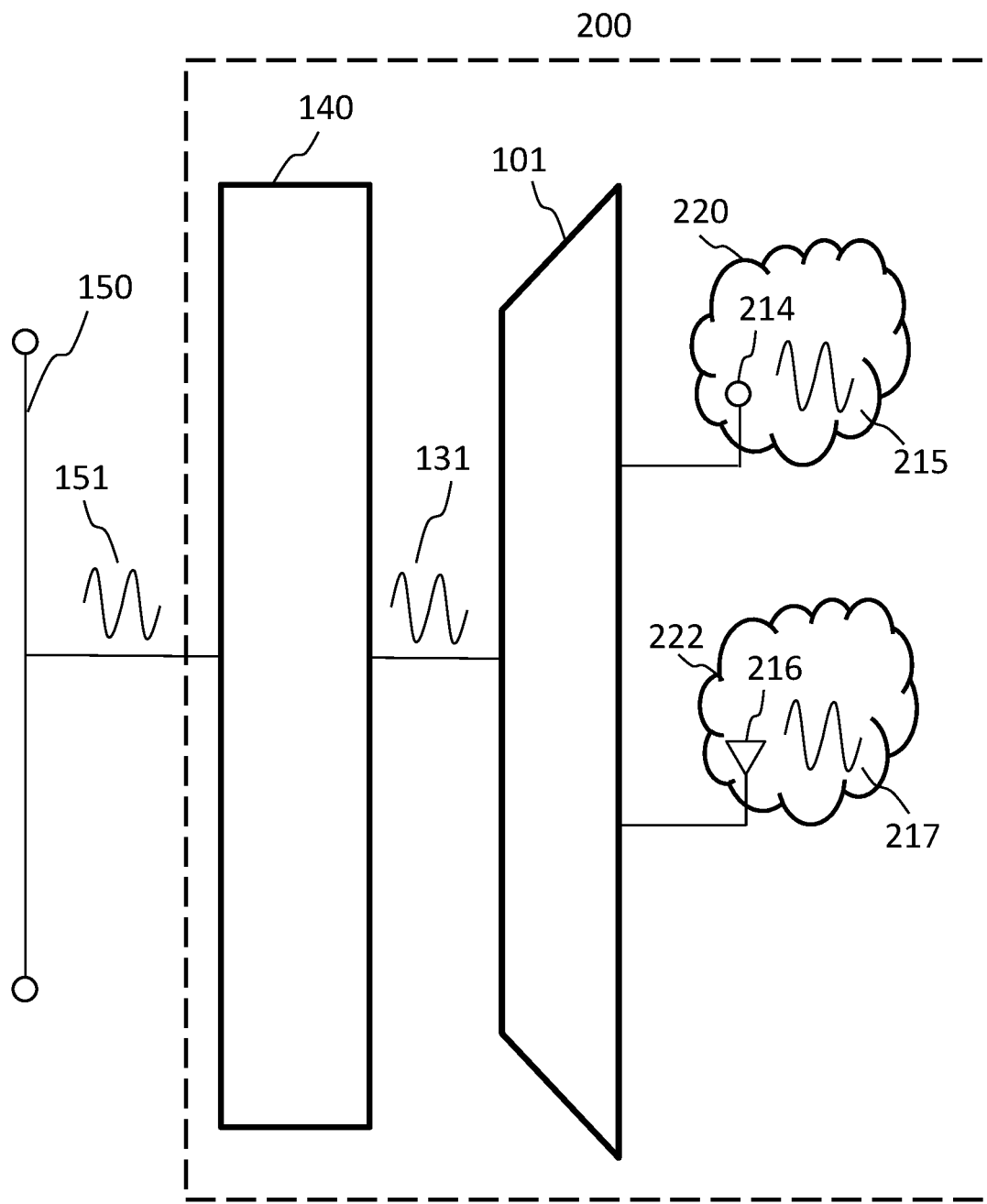
FIG. 2 is a block diagram of a second embodiment of the invented communicator circuit.

FIG. 2 illustrates a second communicator circuit 200 according to another embodiment of the invention. In contrast to the first communicator circuit 100 as shown in FIG. 1, the second communicator circuit 200 includes a first piezoelectric transducer 214 and a second transducer 216 both of which may be electrically coupled with the front-end circuit 101. The first piezoelectric transducer 214 is capable of receiving and/or transmitting a piezosignal 215 through a first piezoconducting medium 220. The second transducer 216 can be a second piezoelectric transducer or an electromagnetic transducer. The second transducer 216 is capable of receiving and/or transmitting a second signal 217 (being a piezosignal or an electromagnetic signal) through a second communication medium 222. In one embodiment, the piezosignal 215 and the second signal 217 are components of a same signal energy. The first piezoconducting medium 220 and the second communication medium 222 may be the same medium or different and segregated mediums according to various embodiments. The front-end circuit 101 is adapted for electrically coupling with, and transmitting a switching circuit output signal 131 to a processing circuit 140. The processing circuit 140 is electrically coupled with and disposed between the front-end circuit 101 and the output target circuit 150, and is adapted to receive the switching circuit output signal 131 and transmit an output signal 151 to the output target circuit 150.

Figure 3A:
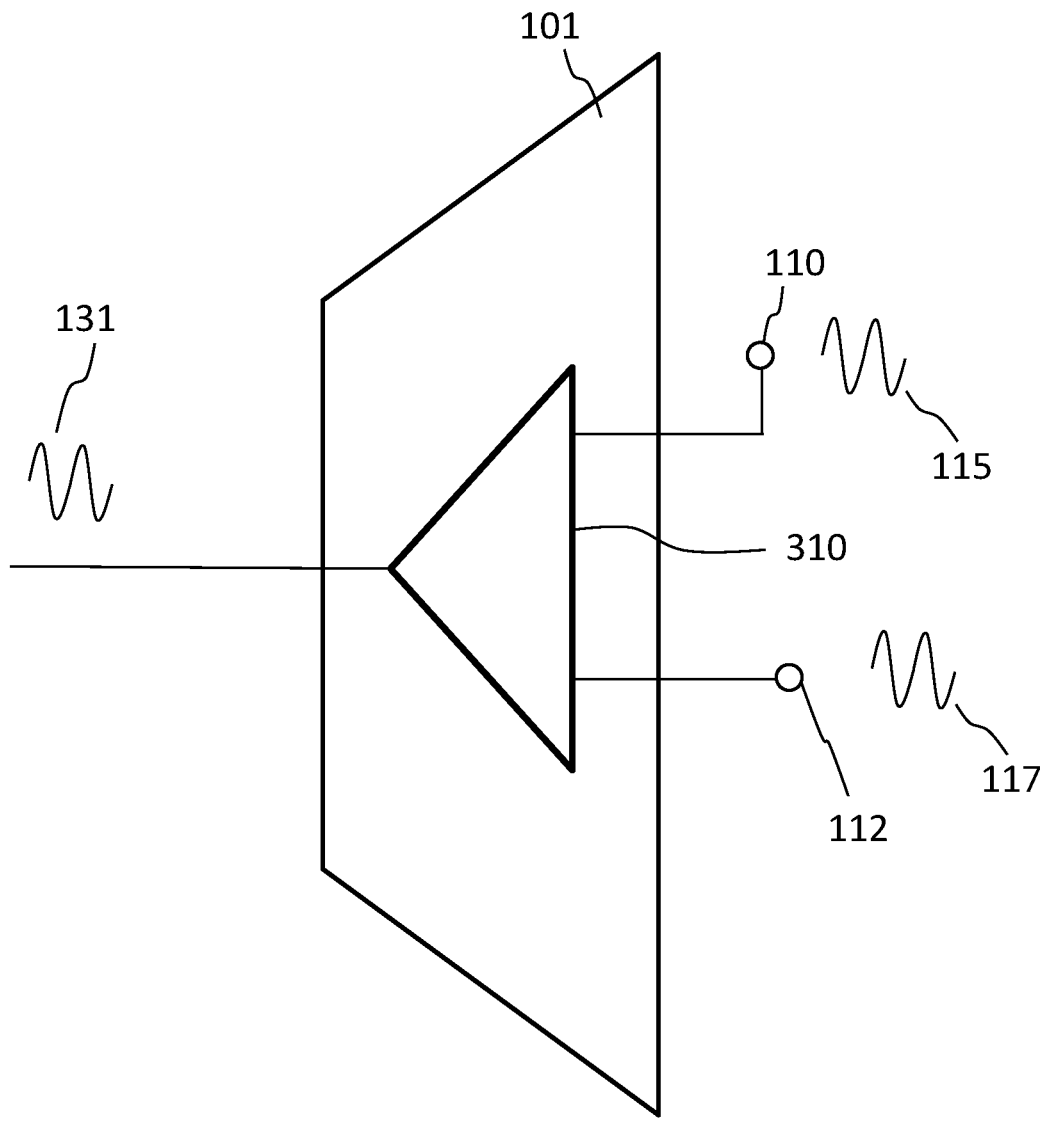
FIG. 3A is a block diagram of a first version of the front-end circuit of FIG. 1 or FIG. 2.
Figure 3B:
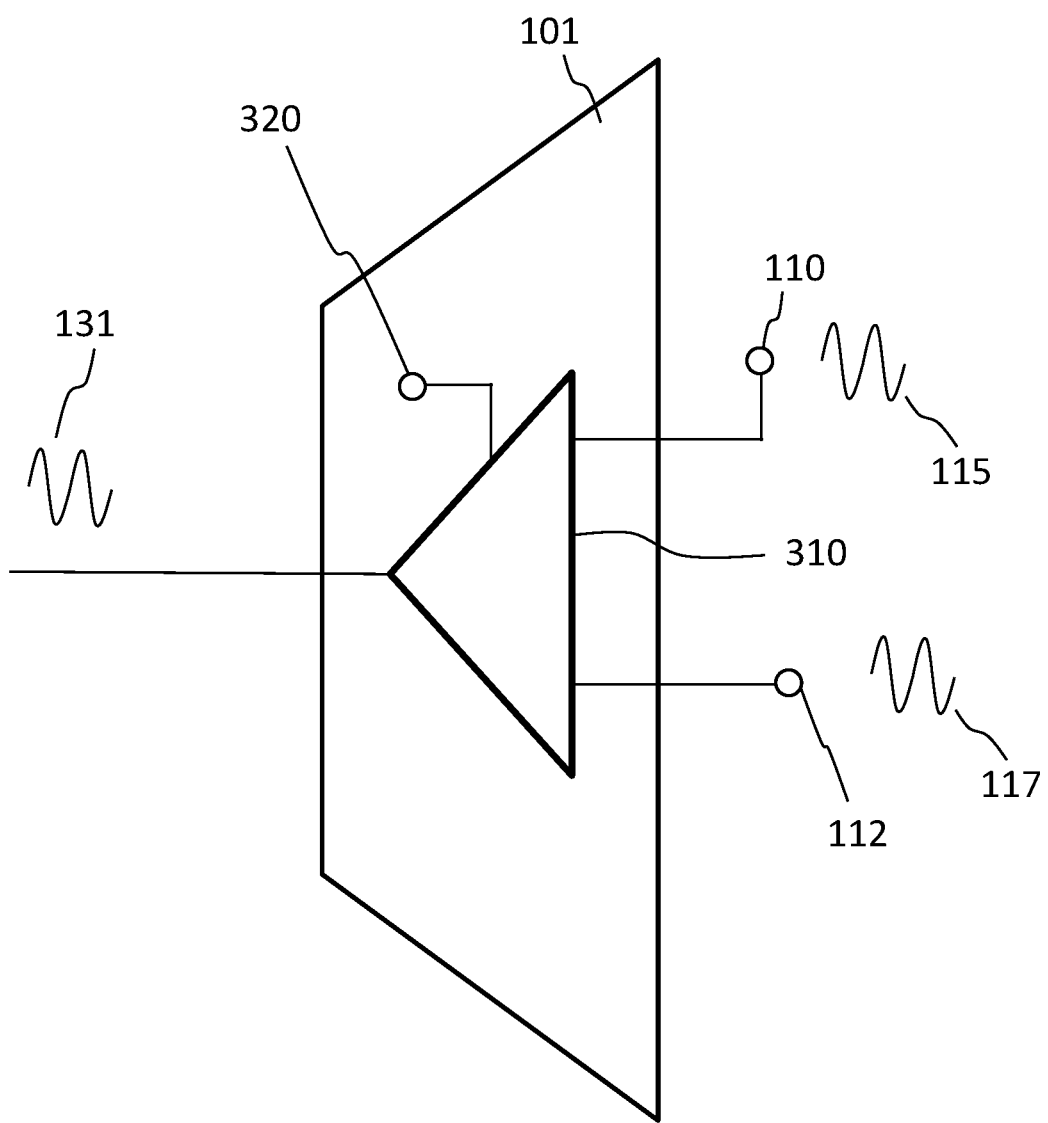
FIG. 3B is a block diagram of a second version of the front-end circuit of FIG. 1 or FIG. 2.

FIG. 3A and FIG. 3B further illustrate the internal modules 310 and 320, as well as the operating mechanism of the front-end circuit 101 that is shown in FIG. 1 and FIG. 2 according to several embodiments.

In one embodiment shown in FIG. 3A and FIG. 1, the front-end circuit 101 includes a switching circuit 310 that is electrically coupled to both the first signal end 110 and the second signal end 112. The switching circuit 310 is adapted to selectively enable a transmission of the piezosignal 115 that is substantively received from the first piezoelectric transducer 114 or the second signal 117 that is substantively received from the second transducer 116 as the switching circuit output signal 131 to the processing circuit 140. According to several embodiments, such selection is based on certain conditions. In one embodiment, the switching circuit 310 will transmit the second signal 117 as the switching circuit output signal 131 to the processing circuit 140, if the first piezosignal 115 is unavailable. According to another embodiment, the switching circuit 310 shown in FIG. 3A can transmit a multiplex signal that is derived from the piezosignal 115 and the second signal 117 as the switching circuit output signal 131 to the processing circuit 140. Yet according to another embodiment, the switching circuit 310 shown in FIG. 3A can transmit a summed signal that is composed of the piezosignal 115 and the second signal 117 as the switching circuit output signal 131 to the processing circuit 140.

According to one embodiment, shown in FIG. 3B and FIG. 1, the front-end circuit 101 includes a switching circuit 310 that is electrically coupled to both the first signal end 110 and the second signal end 112, and a processor 320 that is electrically coupled to the switching circuit 310. According to several embodiments, the processor 320 is adapted to direct the switching circuit 310 to transmit one of the following signal as the switching circuit output signal 131 to the output target circuit 140: the piezosignal 115, the second signal 117, the multiplex signal that is derived from the piezosignal 115 and the second signal 117, the summed signal that is composed of the piezosignal 115 and the second signal 117. Yet in another embodiment, the processor 320 is adapted to direct the switching circuit 310 to transmit no signal to the output target circuit 140.

Figure 4A:
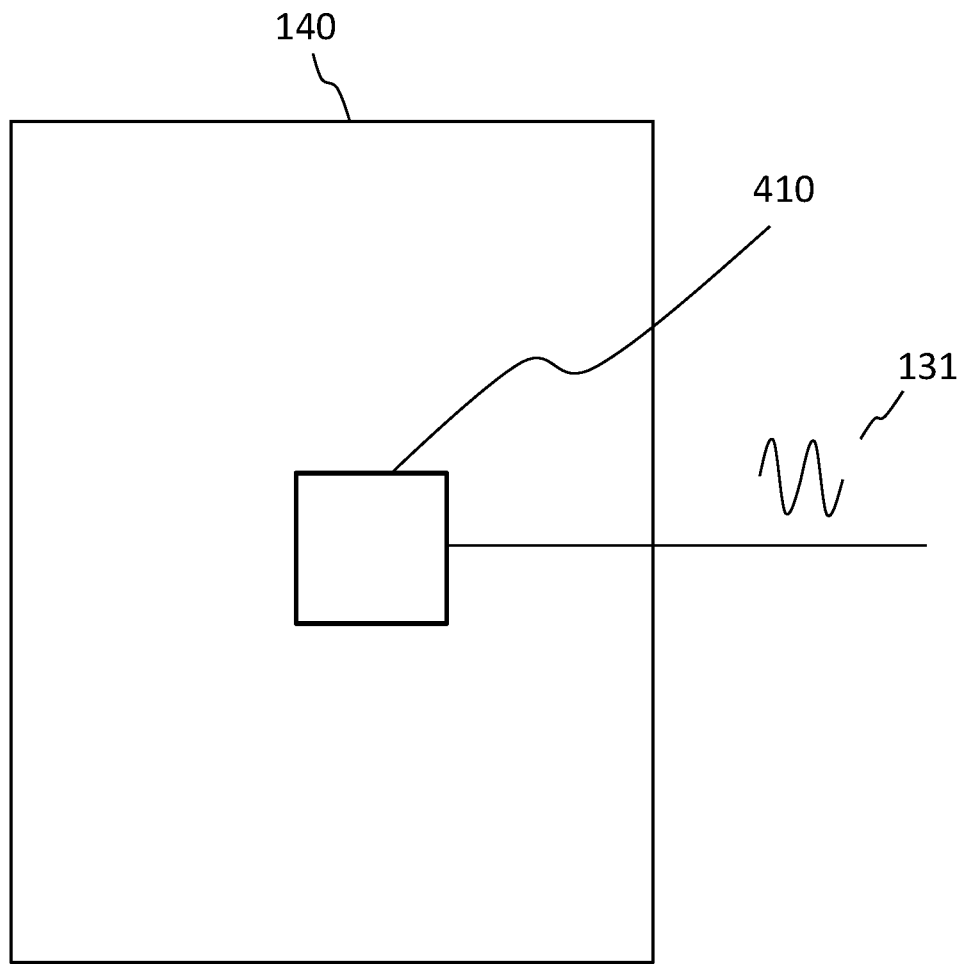
FIG. 4A is a block diagram of a first version of the processing circuit of FIG. 1 or FIG. 2.
Figure 4B:
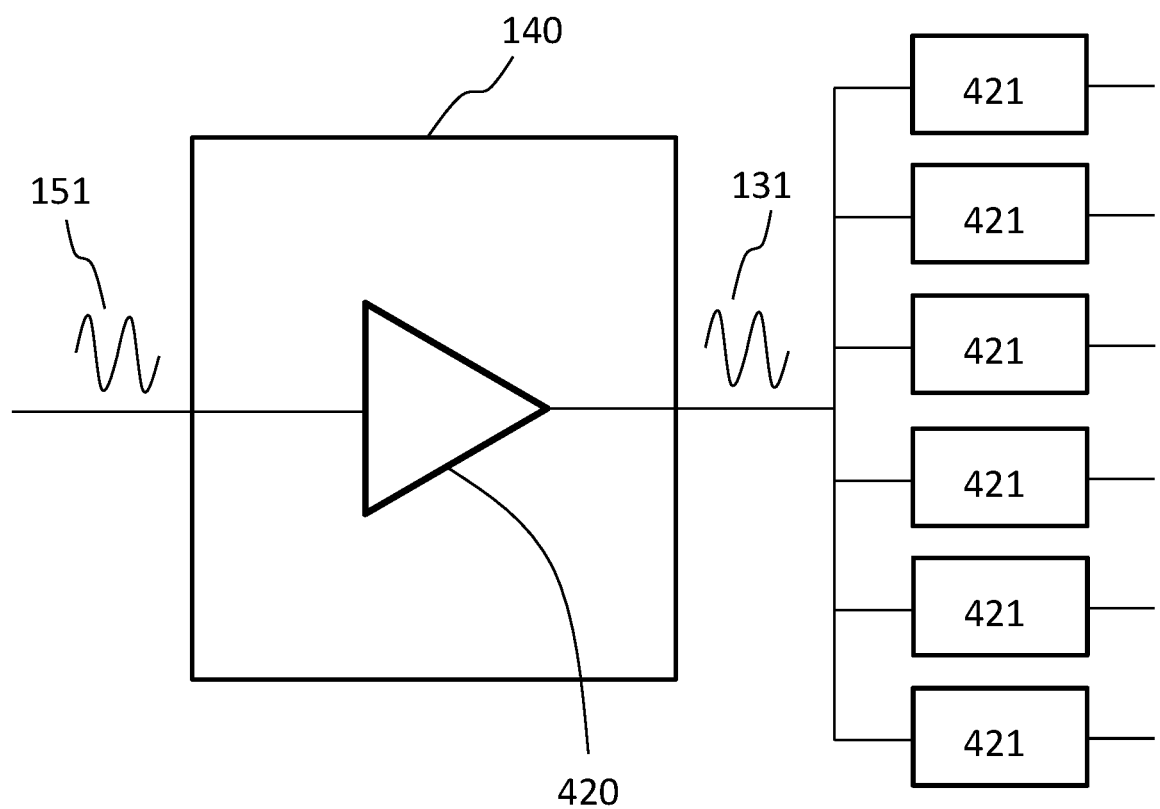
FIG. 4B is a block diagram of a second version of the processing circuit of FIG. 1 or FIG. 2.
Figure 4C:
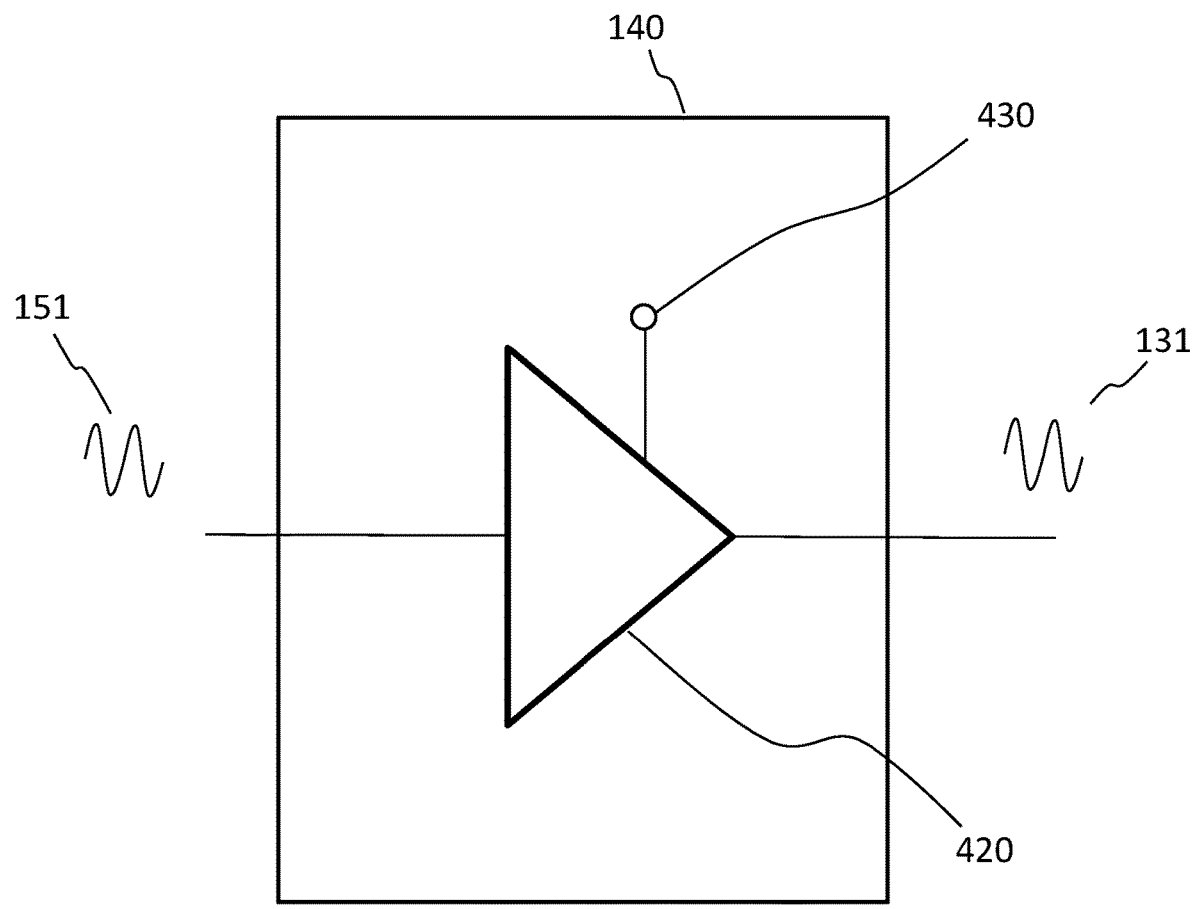
FIG. 4C is a block diagram of a third version of the processing circuit of FIG. 1 or FIG. 2.

FIG. 4A through FIG. 4C further illustrate the internal modules 410, 420 and 430, respectively, as well as the operating mechanism of the processing circuit 140 that is shown in FIG. 1 and FIG. 2 according to several embodiments.

In one embodiment, as illustrated in FIG. 2, FIG. 4 and FIG. 1, the processing circuit 140 includes a memory storage module 410 that is electrically coupled to the switching circuit 310 and adapted to receive from the switching circuit 310 and record the switching circuit output signal 131.

In another embodiment shown in FIG. 2, FIG. 4 and FIG. 1, the processing circuit 140 includes a communications module 420 that is electrically coupled to the switching circuit 310 and adapted to receive and transmit the switching circuit output circuit 131 to the output target circuit 150. In one embodiment, the communications module 420 shown in FIG. 4B is further adapted to generate a pressure-wave output signal that is substantively derived from the switching circuit output signal 131. In another embodiment, the communications module 420 shown in FIG. 4B is further adapted to generate an electromagnetic output signal that is substantively derived from the switching circuit output signal 131. In yet another embodiment the communications module 420 shown in FIG. 4B is adapted to generate a pressure-wave output signal and/or an electromagnetic output signal. According to several embodiments, the pressure-wave output signal can be redirected directly, through the switching circuit 310, or through other circuits, to the first piezoelectric transducer 114, while the electromagnetic output signal can be redirected directly, through the switching circuit 310, or through other circuits, to the second transducer. As a result, the pressure-wave output signal can be converted to pressure waves that are transmitted through the first piezoconducting medium 120, while the electromagnetic output signal can be converted to electromagnetic energy that is transmitted through the second communication medium 122. According to several other embodiments, the pressure-wave output signal and the electromagnetic output signal that are generated by the communications module 420 can be redirected to other transducers 421.

According to another embodiment that is illustrated in FIG. 4C, the processing circuit 140 can further include a transmission logic module 430. The transmission logic module 430 is electrically coupled with the communications module 420. According to several embodiments, the transmission logic module 430 is adapted to direct the communications module 420 to transmit one of the following signals as the output signal 151 to the output target circuit 150, as shown in FIG. 1 the pressure-wave output signal generated by the communications module 420, the electromagnetic output signal generated by the communications module 420, a multiplex signal derived from the pressure-wave output signal and the electromagnetic output signal, and a summed signal substantively composed of a combination of the pressure-wave output signal and the electromagnetic output signal. In one embodiment, the transmission logic module 430 shown in FIG. 4C is electrically coupled with the processor 320 shown in FIG. 3B. In another embodiment, a single processor can function as both the transmission logic module 430 shown in FIG. 4C and the processor 320 shown in FIG. 3B.

Figure 5A:
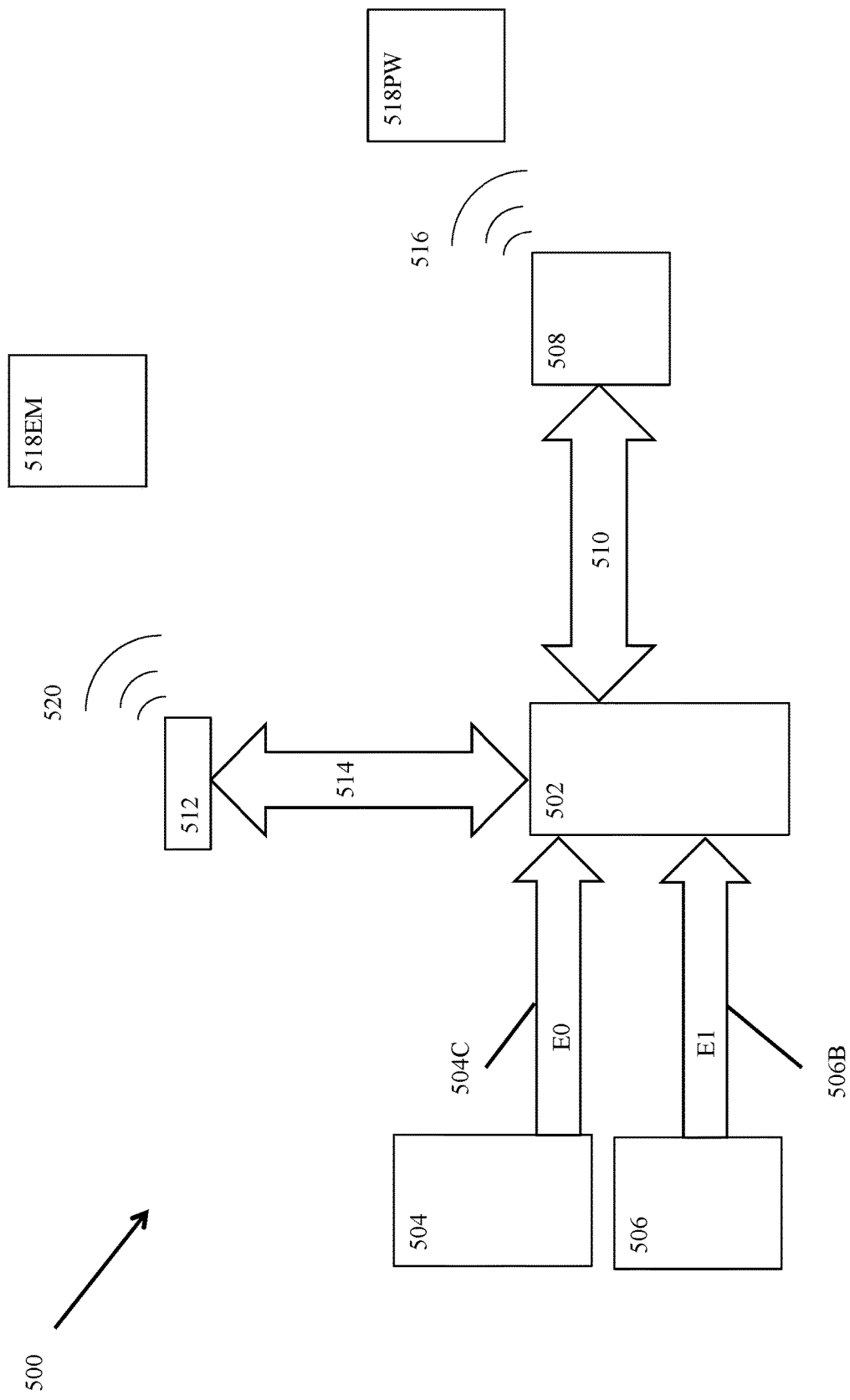
FIG. 5A is a block diagram of a third preferred embodiment of the present invention that includes a summing controller that is coupled to both an electrical power source and a digitized data source.

Referring now generally to the Figures and particularly to FIG. 5A, FIG. 5A is a block diagram of a third preferred embodiment of the present invention (hereinafter, "the third system" 500) that includes a summing controller 502 that is coupled to both an electrical power source 504 and a digitized data source 506. The summing controller 502 is further coupled to both a first alternate piezoelectric transducer 508 by means of a bidirectionally electrically conductive first channel 510 that delivers electromagnetic energy to and from the summing controller 502, and a first electromagnetic transducer 512 by means of a bidirectionally electrically conductive second channel 514 that delivers electromagnetic energy to and from the summing controller 502.

The controller 502 is adapted to receive an electrical energy E0 from the electrical power source 504 via a power signal channel 504C and an information-bearing electrical signal E1 from the digitized data source 506 via a data signal bus 506B and to derive from these energy signals E0 & E1 at least a first piezoelectric control signal PZ1 and/or a first electromagnetic control signal EM1. The first piezoelectric control signal PZ1 is an electrical energy signal generated by the summing controller 502 and includes a derivation of the information-bearing electrical signal E1; the first piezoelectric control signal PZ1 is delivered to the first alternate piezoelectric transducer 508 via of the first channel 510. The first electromagnetic signal EM1 is generated by the summing controller 502 and includes a derivation of the information-bearing electrical signal E1; the first electromagnetic signal EM1 is delivered to the first electromagnetic transducer 512 via of the second channel 514.

The summing controller 502 may be or comprise a suitable programmable electronic controller, microcontroller, processor and/or microprocessor known in the art, such as but not limited to an MSP™ microcontroller as marketed by Texas Instruments, Inc. of Dallas, Tex.

As enabled by the summing controller 502, the first alternate piezoelectric transducer 508 derives a first output pressure wave 516 from the first piezoelectric control signal PZ1 and transmits the first output pressure wave 516 for reception by a pressure wave reception target device 518PW. As alternately or additionally enabled by the summing controller 502, the first electromagnetic transducer 512 derives a first electromagnetic wave energy emission 520 from the first electromagnetic signal EM1 and transmits the first electromagnetic wave energy emission 520 for reception by an electromagnetic energy reception target device 518EM.

Figure 5B:
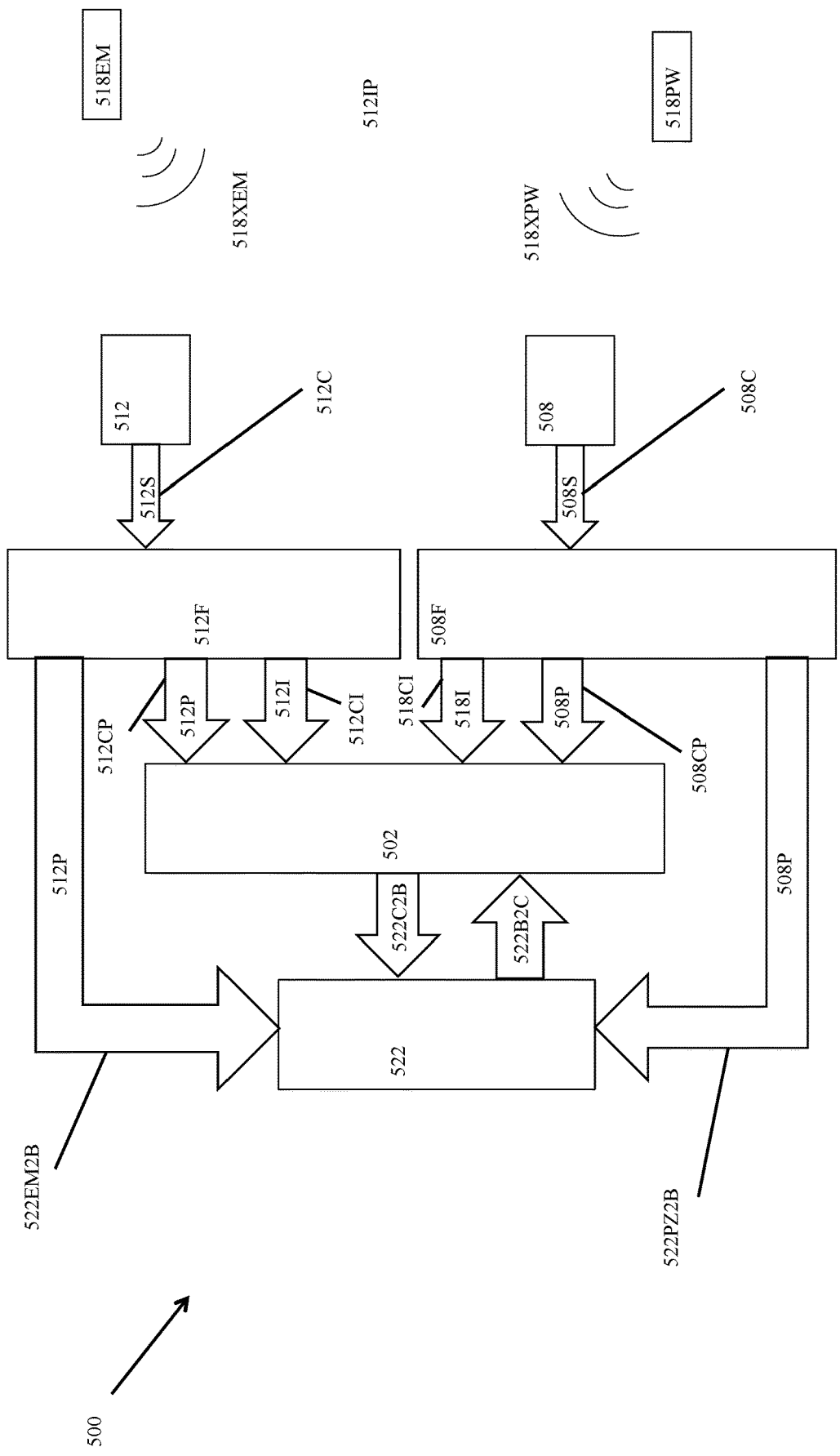
FIG. 5B is a block diagram of the alternate third preferred embodiment of the present invention of FIG. 5A that optionally includes a battery coupled with the one or more of the controller and the transducers of FIG. 5A.

Referring now generally to the Figures and particularly to FIG. 5B, FIG. 5B presents the third system 500 as further including an optional battery 522 that is coupled with one or more of the controller 502, the first alternate piezoelectric transducer 508, and/or the first alternate electromagnetic transducer. The battery 522 may be coupled with a power-to-controller channel 522B2C that enables the controller 502 to receive the power signal E0 from the battery 522. The third system may alternatively or optionally include a controller-to-battery channel 522C2B that enables the controller 502 to deliver electrical energy sourced from either transducer 508 & 512 to the battery 522.

The third system 500 may further optionally or alternatively include a first piezoelectric transducer filter 508F that is disposed between the first alternate piezoelectric transducer 508 and the controller 502. The first alternate piezoelectric transducer 508 receives target pressure wave energy 518XPW from a pressure wave generating target device 518PW and generates therefrom an internal electromagnetic PZ signal 508S. A PZ filter channel 508C receives the internal electromagnetic PZ signal 508S from the first alternate piezoelectric transducer 508 and delivers the internal electromagnetic PZ signal 508S to the first PZ transducer filter 508F. The first PZ transducer filter 508F filters out a PZ information signal 508I and a PZ electrical power component 508P from the internal electromagnetic PZ signal 508S and delivers at least the PZ information signal 508I to the controller via a PZ information channel 418CI, and optionally and additionally delivers the PZ electrical power component 508P via a PZ power channel 508CP to the controller 502. The controller 502 may be adapted and configured to deliver at least a portion of the received PZ electrical power component 508P to the battery 522 via the controller-to-battery channel 522C2B.

Optionally, alternatively or additionally, the third system 500 may include a PZ-to-battery channel 522PZ2B that delivers the PZ electrical power component 508P from the first PZ transducer filter 508F to the battery 522.

The third system 500 may further optionally or alternatively include a first electromagnetic transducer filter 512F that is disposed between the first alternate electromagnetic transducer 512 and the controller 502. The first alternate electromagnetic transducer 512 receives target electromagnetic energy 518XEM from an electromagnetic energy generating target device 518EM and generates therefrom an internal electromagnetic EM signal 512S. An EM filter channel 512C receives the internal electromagnetic signal 512S from the first alternate electromagnetic transducer 512 and delivers the internal electromagnetic signal 512S to the first electromagnetic transducer filter 512F. The first electromagnetic transducer filter 512F filters out an electromagnetic information signal 512I and an electrical power component 512P from the internal electromagnetic signal 512S and delivers at least the electromagnetic information signal 512I to the controller 502 via as EM information channel 512CI, and optionally and additionally delivers the electrical power component 512P via an EM power channel 512CP to the controller 502. The controller 502 may be adapted and configured to deliver at least a portion of the received EM electrical power component 512P to the battery 522 via the controller-to-battery channel 522C2B.

Optionally, alternatively or additionally, the third system 500 may include a electromagnetic filter-to-battery channel 522EM2B that delivers the EM electrical power component 512P from the first electromagnetic transducer filter 512F to the battery 522.

Figure 5C:
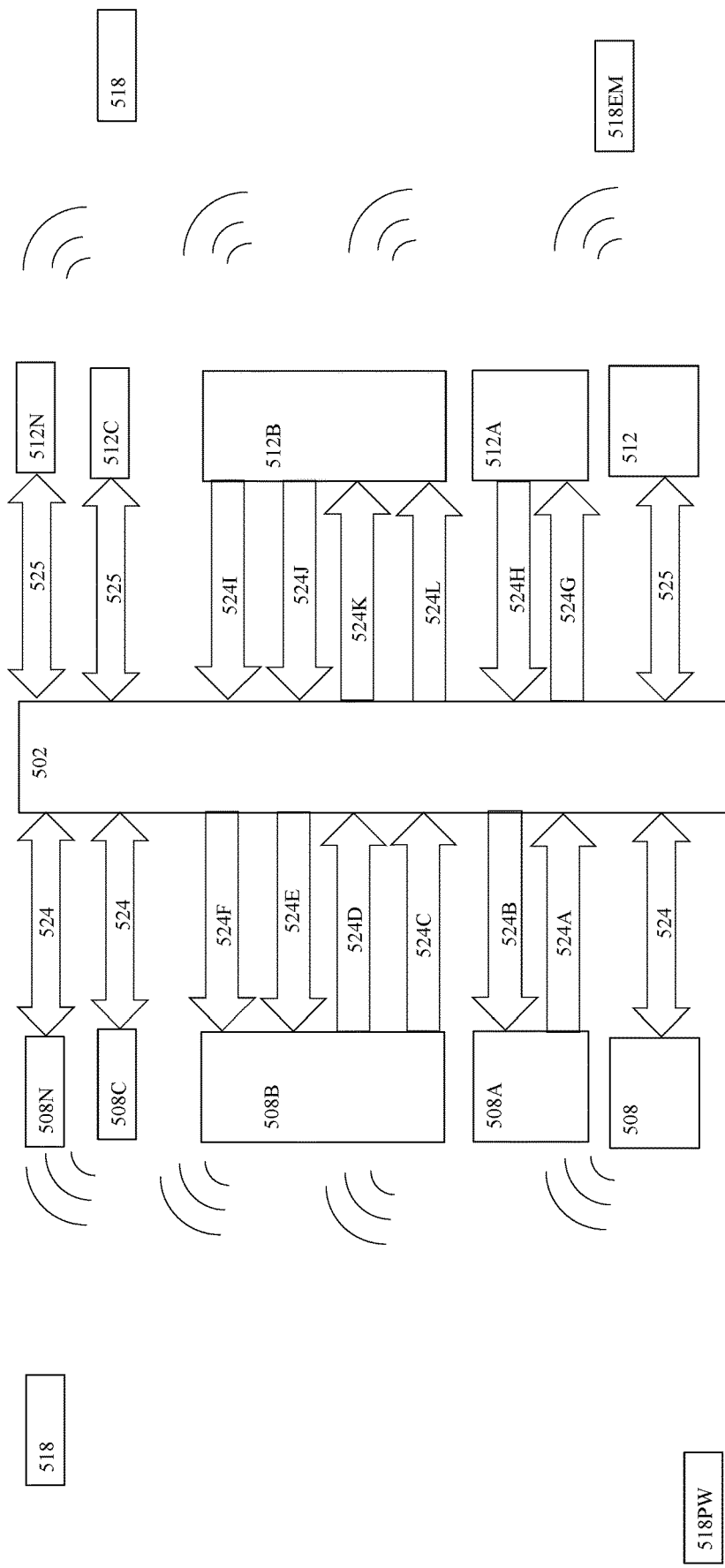
FIG. 5C is a block diagram of an alternate third preferred embodiment of the present invention of FIG. 5A that includes a plurality of target devices, electromagnetic transducers and piezoelectric transducers.

Referring now generally to the Figures and particularly to FIG. 5C, FIG. 5C is a block diagram of additional optional aspects and elements of the third system 500, wherein a plurality of electromagnetic transducers 512 & 512A-512N are a plurality of piezoelectric transducers 508 & 508A-508N are bi-directionally communicatively coupled with the controller 502 in one of a variety of communications pathway configurations. It is understood that one or more electromagnetic transducers 512-512N be or comprise a suitable electromagnetic energy receiving transducers, such as but not limited to, a CC1101 ™ a Low-Power Sub-1 GHz RF transceiver, as marketed by Texas Instruments of Dallas, Tex., or other suitable electromagnetic energy wave transducer or emitter known in the art. It is further understood that one or more piezoelectric transducers 508-508N may be or comprise a suitable pressure wave energy receiving transducers, such as but not limited to, a 90-4070 ™ ceramic ultrasonic transducer as marketed by APC International, Ltd.

of Mill Hall, Pa., or other suitable piezoelectric or pressure wave transducer or emitter known in the art.

The first alternate piezoelectric transducer 508 transmits and receives information bearing signals and electrical power to the controller 502 via a bi-directional power and communications bus 524. A second alternate piezoelectric transducer 508A (a.) transmits information bearing signals and electrical power to the controller 502 via a first uni-directional power and communications bus 524A, and (b.) receives information bearing signals and electrical power from the controller 502 via a second uni-directional power and communications bus 524B. A third alternate piezoelectric transducer 508B (a.) transmits information bearing signals to the controller 502 via a first uni-directional communications channel 524C, (b.) transmits electrical power to the controller 502 via a first uni-directional power channel 524D, (c.) receives information bearing signals from the controller 502 via a second uni-directional communications channel 524E, and (d.) receives electrical power from the controller 502 via a second uni-directional power channel 524F.

The first alternate electromagnetic transducer 512 transmits and receives information bearing signals and electrical power to the controller 502 via an additional bi-directional power and communications bus 525. A second alternate electromagnetic transducer 512G (a.) transmits information bearing signals and electrical power to the controller 502 via a first uni-directional EM power and communications bus 524A, and (b.) receives information bearing signals and electrical power from the controller 502 via a second uni-directional EM power and communications bus 524H. A third alternate electromagnetic transducer 512B (a.) transmits information bearing signals to the controller 502 via a first uni-directional EM communications channel 524I, (b.) transmits electrical power to the controller 502 via a first uni-directional EM power channel 524J, (c.) receives information bearing signals from the controller 502 via a second uni-directional EM communications channel 524K, and (d.) receives electrical power from the controller 502 via a second uni-directional EM power channel 524L.

Figure 6:
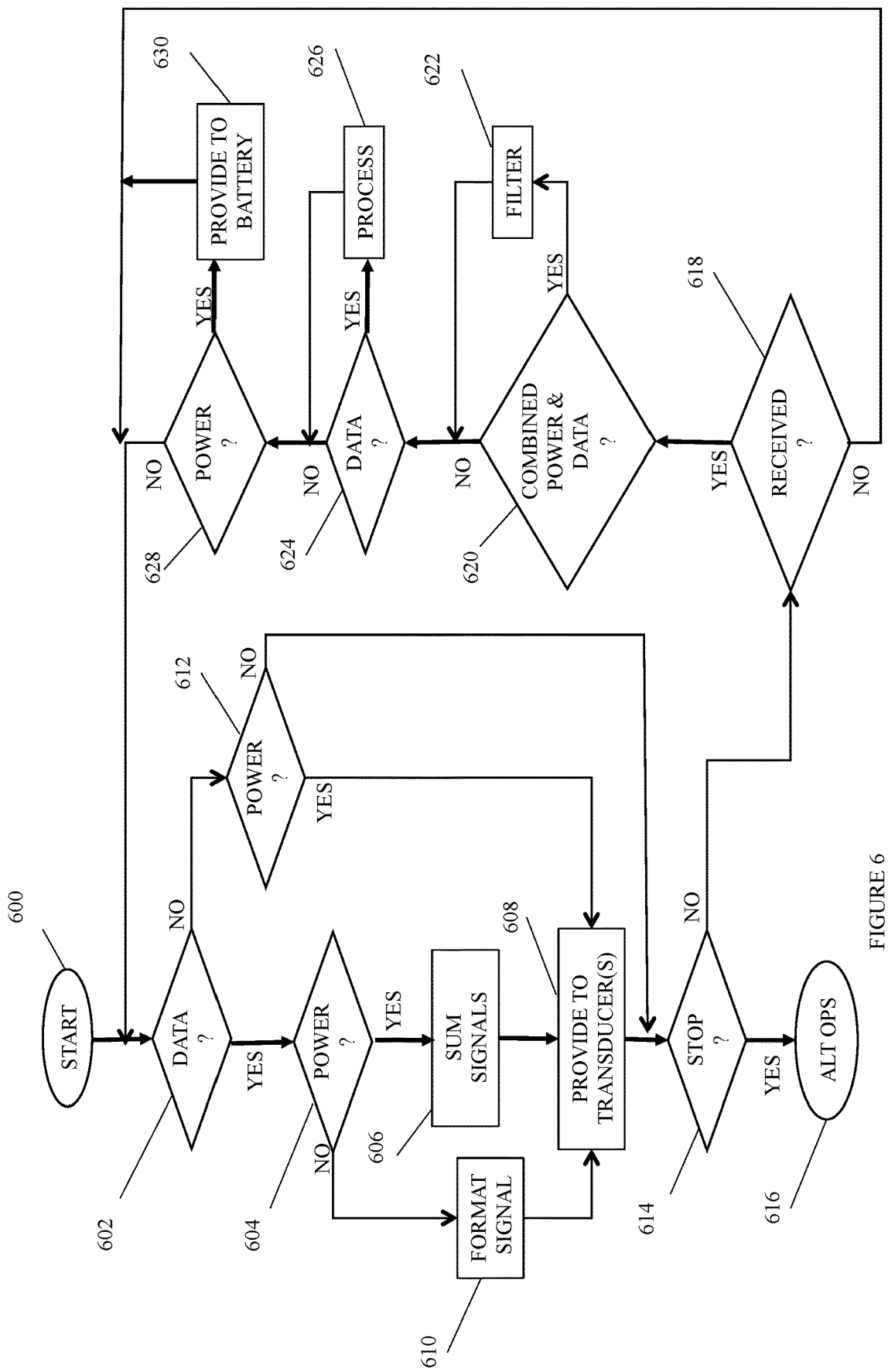
FIG. 6 is a flowchart of optional aspects of the operation of the controller of FIG. 5A.

FIG. 6 is a flowchart of optional aspects of the operation of the controller 502. In step 600 the summing controller 502 powers up and determines in step 602 if any data has been received from the data source 504. When the summing controller 502 determines in step 602 that data E0 has been received from the digitized data source 504 and further in step 606 that electrical energy E1 is to be accessed from the electrical power source 506, the summing controller 502 proceeds on to step 606 and sums the received data E0 of step 602 with electrical energy E1 received from the electrical energy source 506 and provides the summed signal to one or more transducers 508-508N & 512-512N in step 608.

In the alternative, the summing controller 502 proceeds from step 604 to step 610 when no electrical power E1 is to be transmitted. In step 610 the received digitized data E0 is formatted into a formatted signal which is then provided to one or more transducers 508-508N & 512-512N in step 608. In another alternative, the summing controller 502 proceeds from step 602 to step 612 when no received data E0 is detected in step 602. When the summing controller 502 determines in step 612 that no electrical power E1 is authorized to be transmitted, the summing controller 502 proceeds from step 612 to step 614 and to determine if alternate operations shall be performed in step 616.

When the summing controller 502 proceeds from step 614 to step 618, the summing controller 502 determines whether one or more transducers 508-508N & 512-512N has respectively received either external electromagnetic energy or external pressure wave energy. If the summing controller 502 determines in step 618 that no transducer 508-508N & 512-512N has received external energy, the summing controller 502 proceeds back to an additional execution of step 602. In the alternative, when the summing controller 502 determines in step 618 that at least one transducer 508-508N & 512-512N has received external energy, the summing controller 502 proceeds on to step 620 and to determine if an information bearing signal shall be separated from the received energy and filters out the information bearing message from any additional power signal in step 622. The summing controller 502 determines in step 624 if any information has been found in the received energy in step 624 and proceeds to process, e.g., store or retransmit, any detected received information in step 626. The summing controller 502 determines in step 628 if any storable power has been found in the received energy and proceeds to transfer any such received storable power in step 630. The summing controller 502 proceeds from step 618, step 630 or step 628 to an additional execution of step 602.

Figure 7:
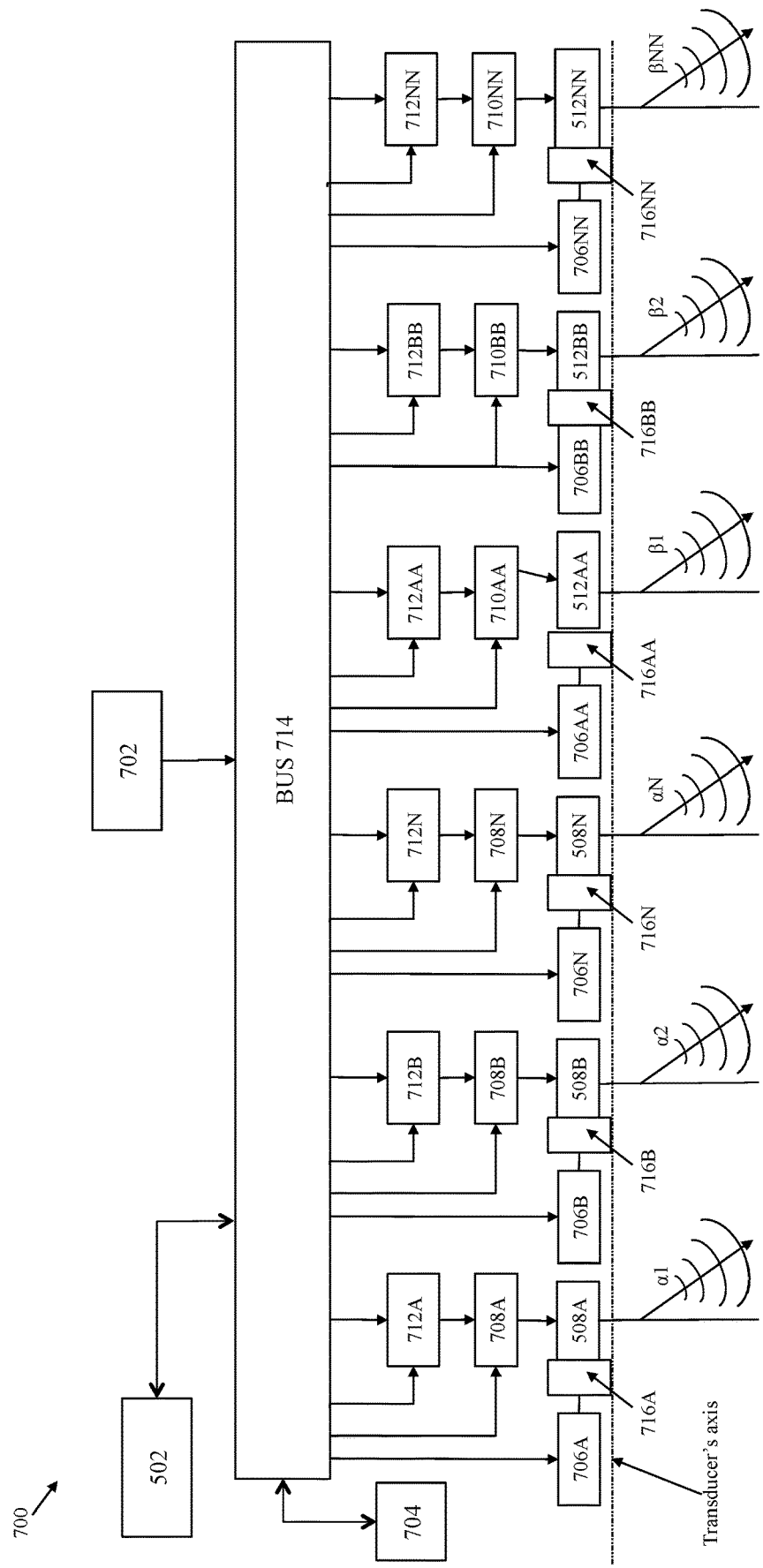
FIG. 7 is a block diagram of an alternate fourth embodiment of the present invention that further comprises the transducers and summing controller of FIG. 5C and means to phase shift energy emitted from the transducers.

Referring now generally to the Figures and particularly to FIG. 7, FIG. 7 is a block diagram of an alternate fourth embodiment of the present invention 700 (hereinafter, "the fourth system" 700) that further comprises an EM signal source 702, a servomotor controller 704, a plurality of servomotors 706A-706NN, a plurality of PW programmable phase-shift delay circuits 708A-708N, a plurality of EM phase-shift delay circuits 710AA-710NN, a plurality of controllable signal switches 712A-712NN, and a communications and power bus 714. It is understood that in certain alternate preferred embodiments of the fourth method, some or all of the aspects and functionalities of the servomotor controller 704 are comprised within and/or provided by the summing controller 502.

The signal source is communicatively coupled via the communications and power bus 714 to each EM programmable phase-shift delay circuits 708A-708N and each PW phase-shift delay circuits 710AA-710NN. Individual dedicated controllable signal switches 712A-712NN are each separately disposed on a one-to-one basis between the via the communications and power bus 714 and a single EM transducer 512AA-512NN or a single PW transducer 508A-508N.

The communications and power bus 714 additionally communicatively couples the summing controller 502 to each controllable signal switch 712A-712NN, each of the plurality of EM programmable phase-shift delay circuits 708A-708N and each of the plurality of PW phase-shift delay circuits 710AA-710NN. The communications and power bus 714 also communicatively couples the servomotor controller 704 to each of the plurality of servomotors 706A-706NN.

Each servomotor 706A-706NN comprises a platen 716A-716NN to which one of plurality of piezoelectric transducers 508AA-508NN or one of the plurality of electromagnetic transducers 512A-512N is exclusively mechanically coupled in a one-to-one basis.

FIG. 7 represents that each EM transducer 512AA-512NN is emitting energy that has been uniquely phase shifted as a result of phase shifting by one dedicated programmable EM phase-shift delay circuit 708A-708N; and further that each piezoelectric transducer 508AA-508NN is emitting energy that has been uniquely phase shifted by one dedicated programmable PW phase-shift delay circuits 710A-710NN.

Figure 8:
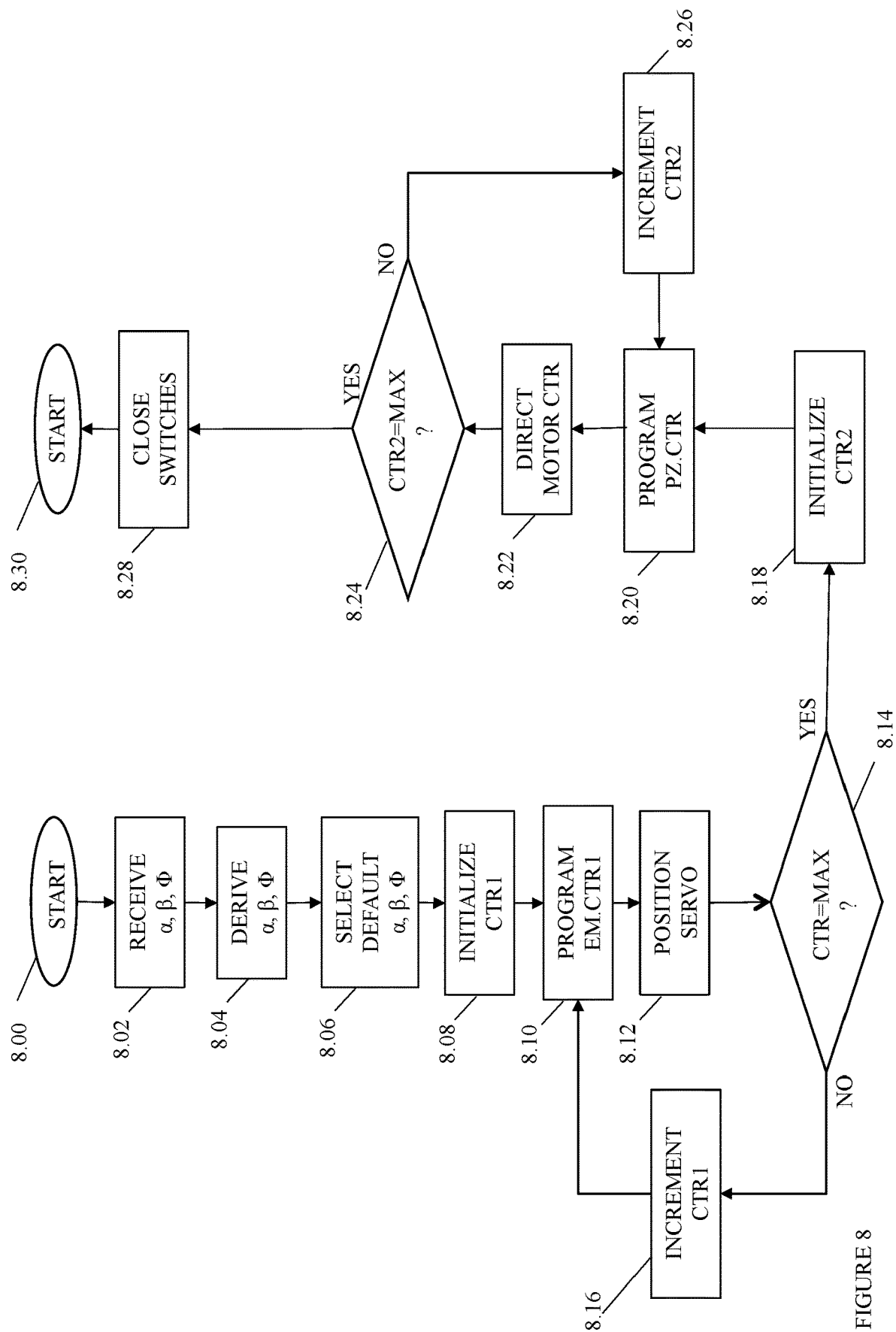
FIG. 8 is a flowchart of a fourth alternate preferred embodiment of the present invention of FIG. 4 wherein the transducers and summing controller of FIG. 5C emit phase-shifted energy.

Referring now generally to the Figures and particularly to FIG. 8, FIG. 8 is a flowchart of a fourth alternate preferred embodiment of the method of the present invention (hereinafter, "the fourth method"), wherein the plurality of electromagnetic transducers 512AA-512NN and the plurality piezoelectric transducers 508A-508N emit individually phase-shifted energy waves and whereby the energy emitted from the fourth system 700 is directed toward an external target device (not shown). The flowchart of FIG. 8 illustrates the summing controller 502 directing the transducers 508A-508N & 512AA-512NN providing emissions of phase-shifted energy.

In step 8.00 the fourth system 700 powers up and in optional step 8.02 the summing controller 502 receives the one or more of the values α, β, or Φ from an outside source (not shown). It is understood that the α value is a factor of mechanical orientation applicable to one or more of the piezoelectric transducers 508A-508N; that the β value is an EM factor of mechanical orientation applicable to one or more of the EM transducers 512AA-512NN; and the Φ value is a phase shift factor applicable to the phase shifting of output signals of one or more of the transducers 508A & 508N and 512AA & 512NN.

Alternatively, optionally or additional to step 8.04, the fourth system 700 in step 8.06 derives the one or more of the values α, β, or Φ, and in further alternatively, optionally or additional to step 8.02, the fourth system 700 selects default values.

The summing controller initializes a first counter variable CTR to a null value in step 8.08 and proceeds through the loop of steps 8.10 through 8.14 wherein (a.) in step 8.10 the summing controller sequentially programs each EM transducer phase-shift delay circuit 710AA-710NN with preferably ascending or descending multiples of the phase shift value Φ; and (b.) directs the positioning of each corresponding servomotor platen 716AA-716NN in step 8.12 in accordance with the β values, i.e. the β1 value through the βNN value. In step 8.14 the summing controller determines whether the current value of the first counter variable CTR1 has become equal or greater than the total count NN of EM transducers 512AA-512NN. When the summing controller determines in step 8.14 that the current value of the first counter variable CTR1 has not become equal or greater than in value than the NN count, the summing controller proceeds on to step 8.16 and increments the value of the first counter variable CTR1. The summing controller proceeds on from step 8.16 to perform an additional execution of step 8.10. Alternatively, when the summing controller determines in step 8.14 that the current value of the first counter variable CTR1 has become equal or greater than in value than the NN count, the summing controller proceeds from step 8.14 to step 8.16 and initializes a second counter variable CTR2.

The summing controller 502 proceeds from step 8.18 and to execute the loop of steps 8.20 through 8.26, wherein (a.) in step 8.20 the summing controller sequentially programs each piezoelectric transducer phase-shift delay circuit 708A-708N with preferably ascending or descending multiples of the phase shift value Φ; and (b.) directs the positioning of each corresponding servomotor platen 716A-716N in step 8.22 in accordance with the α values, i.e. the a1 value through the αN value. In step 8.24 the summing controller determines whether the current value of the second counter variable CT2 has become equal or greater than the total count N of piezoelectric transducers 508A-508N. When the summing controller determines in step 8.24 that the current value of the second counter variable CTR2 has not become equal or greater than in value than the N count, the summing controller proceeds on to step 8.26 and increments the value of the second counter variable CTR2. The summing controller proceeds on from step 8.26 to perform an additional execution of step 8.20. Alternatively, when the summing controller determines in step 8.24 that the current value of the second counter variable CTR12 has become equal or greater than in value than the N count, the summing controller proceeds from step 8.24 to step 8.28 and directs the switches 712A-712NN to open and to allow an electromagnetic signal from the signal source 702 to reach the phase shift delay circuits 708A-708N, whereby the energy emitted from the fourth system 700 is directed toward an external target device (not shown).

The summing controller 502 proceeds from step 8.28 and to execute alternate computational operations.

The foregoing disclosures and statements are illustrative only of the Present Invention, and are not intended to limit or define the scope of the Present Invention. The above description is intended to be illustrative, and not restrictive. Although the examples given include many specificities, they are intended to be illustrative only of certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

We claim:

1. A communicator and energy transmission circuit coupled with an electrical power source, comprising:
    a controller, the controller including a first energy channel and a second energy channel, wherein the controller selectively provides electrical energy to the first energy channel and the second energy channel;
    a first piezoelectric transducer, the first piezoelectric transducer coupled with the first energy channel, and the first piezoelectric transducer adapted to transmit a first output pressure wave energy emission;
    a first electromagnetic energy transducer, the first electromagnetic energy transducer coupled with the second energy channel, and the first electromagnetic energy transducer adapted to transmit a first output electromagnetic wave energy emission; and
    a plurality of piezoelectric transducers, wherein each piezoelectric transducer is communicatively coupled with the controller and each piezoelectric transducer receives and converts external pressure wave energy into a component of input electromagnetic energy, and each piezoelectric transducer partially delivers the input electromagnetic energy to the controller, and at least one piezoelectric transducer delivers an information-bearing component of the external pressure wave energy of the input electromagnetic energy delivered to the controller.

2. The communicator and energy transmission circuit of claim 1, wherein the first piezoelectric transducer receives an external pressure wave energy and converts the external wave pressure energy into a first internal electromagnetic signal and the first piezoelectric transducer delivers the first internal electromagnetic signal to the controller via the first energy channel.

3. The communicator and energy transmission circuit of claim 2, wherein the first piezoelectric transducer transmits the first output pressure wave energy emission while simultaneously receiving and converting the external pressure wave energy into the first internal electromagnetic signal.

4. The communicator and energy transmission circuit of claim 2, further comprising a first alternate energy channel coupled with both the controller and the first piezoelectric transducer, and the first piezoelectric transducer delivers the first internal electromagnetic signal to the controller via the first alternate energy channel.

5. The communicator and energy transmission circuit of claim 2, wherein the first piezoelectric transducer transmits the first output pressure wave energy and while the first piezoelectric transducer simultaneously receives and converts the external pressure wave energy into the first internal electromagnetic signal.

6. The communicator and energy transmission circuit of claim 2, further comprising a filter circuit disposed between the controller and the first piezoelectric transducer, the filter circuit separating the first internal electromagnetic signal into a received information-bearing signal and a received power signal and delivering the received information-bearing signal to the controller.

7. The communicator and energy transmission circuit of claim 6, further comprising an electrical energy storage battery coupled to the filter circuit, wherein the filter circuit delivers the received power signal to the electrical energy storage battery.

8. The communicator and energy transmission circuit of claim 1, wherein the first electromagnetic transducer receives an external electromagnetic energy and converts the external electromagnetic energy into a second internal electromagnetic signal, and the first electromagnetic transducer delivers the second internal electromagnetic signal to the controller via the second energy channel.

9. The communicator and energy transmission circuit of claim 8, wherein the first electromagnetic transducer transmits the first output electromechanical energy emission while the first electromagnetic transducer simultaneously receives and converts the external electromagnetic transducer energy into the second internal electromagnetic signal.

10. The communicator and energy transmission circuit of claim 1, further comprising a second alternate energy channel coupled with both the controller and the first electromagnetic transducer, and the first electromagnetic transducer delivers the second internal electromagnetic signal to the controller via the second alternate energy channel.

11. The communicator and energy transmission circuit of claim 10, wherein the first electromagnetic transducer transmits the first output electromagnetic energy emission while the first electromagnetic transducer simultaneously receives and converts the external electromagnetic transducer energy into the second internal electromagnetic signal.

12. The communicator and energy transmission circuit of claim 1, wherein the controller is coupled with the electrical energy storage battery and the electrical energy storage battery provides electrical energy to the controller.

13. The communicator and energy transmission circuit of claim 1, further comprising a plurality of electromagnetic transducers, wherein each electromagnetic transducer is communicatively coupled with the controller and each electromagnetic transducer receives and converts and adds additional external electromagnetic energy into the input electromagnetic energy, and each electromagnetic transducer delivers a component of the additional electromagnetic energy to the controller.

14. The communicator and energy transmission circuit of claim 13, wherein at least one electromagnetic transducer delivers an information-bearing component of the external electromagnetic energy in the additional electromagnetic energy delivered to the controller.

15. The communicator and energy transmission circuit of claim 13, further comprising a filter circuit disposed between the controller and the electromagnetic energy transducer, the filter circuit separating the first internal electromagnetic signal into a received information-bearing signal and a received power signal and delivering the received information-bearing signal to the controller.

16. The communicator and energy transmission circuit of claim 15, further comprising an electrical energy storage battery coupled to the filter circuit, wherein the filter circuit delivers the received power signal to the electrical energy storage battery.

17. The communicator and energy transmission circuit of claim 16, wherein the controller is coupled with the electrical energy storage battery and the electrical energy storage battery provides electrical energy to the controller.

18. The communicator and energy transmission circuit of claim 13, wherein at least one electromagnetic transducer of the plurality of electromagnetic transducers is adapted to direct a vector of an output electromagnetic energy as directed by the controller.

19. The communicator and energy transmission circuit of claim 13, wherein at least two electromagnetic transducers of the plurality of electromagnetic transducers are each adapted to direct a separate vector of different information-bearing output electromagnetic energy to a same target device as directed by the controller.

20. A system comprising:
a controller, the controller including a first energy channel and a second energy channel, wherein the controller selectively provides electrical energy to the first energy channel and the second energy channel;
a first piezoelectric transducer, the first piezoelectric transducer coupled with the first energy channel, and the first piezoelectric transducer adapted to transmit a first output pressure wave energy emission;
a first electromagnetic energy transducer, the first electromagnetic energy transducer coupled with the second energy channel, and the first electromagnetic energy transducer adapted to transmit a first electromagnetic wave energy emission;
a target circuit, the target circuit receiving the output pressure wave energy emission; and
a plurality of piezoelectric transducers, wherein each piezoelectric transducer is communicatively coupled with the controller and each piezoelectric transducer receives and converts external pressure wave energy into a component of input electromagnetic energy, and each piezoelectric transducer partially delivers the input electromagnetic energy to the controller, and at least one piezoelectric transducer delivers an information-bearing component of the external pressure wave energy of the input electromagnetic energy delivered to the controller.

21. The system of claim 20, wherein the output pressure wave energy emission bears an information and the target circuit extracts the information from the output pressure wave energy emission.

* * * * *